United States Patent [19]
Van Esdonk et al.

[11] 3,819,500
[45] June 25, 1974

[54] MEASURING CELL FOR DETERMINING OXYGEN CONCENTRATIONS IN A GAS MIXTURE

[75] Inventors: Johannes Van Esdonk; Petrus Jacobus Poolman, both of Emmasingel, Eindhoven, Netherlands

[73] Assignee: U. S. Philips Corporation, New York, N.Y.

[22] Filed: Jan. 22, 1973

[21] Appl. No.: 325,867

[30] Foreign Application Priority Data
Feb. 21, 1972 Netherlands.................. 7202272

[52] U.S. Cl. ........................................... 204/195 S
[51] Int. Cl. ..................... G01n 27/30, G01n 27/46
[58] Field of Search............ 204/195 S, 1 T; 324/29

[56] References Cited
UNITED STATES PATENTS
| | | | |
|---|---|---|---|
| 3,378,478 | 4/1968 | Kolodney et al. | 204/195 S |
| 3,616,274 | 10/1971 | Eddy | 204/1 T |
| 3,619,381 | 11/1971 | Fitterer | 204/1 T |
| 3,738,341 | 6/1973 | Loos | 324/29 X |

*Primary Examiner*—G. L. Kaplan
*Attorney, Agent, or Firm*—Frank R. Trifari

[57] ABSTRACT

A measuring cell for determining oxygen concentrations in an exhaust mixture, consisting of a metal housing in which a detachable plate of stabilised $ZrO_2$ is clamped between two metal rings, one ring establishing contact with the housing and the other with a lead-through conductor which is present in an insulating plate provided with gas stream apertures.

6 Claims, 7 Drawing Figures

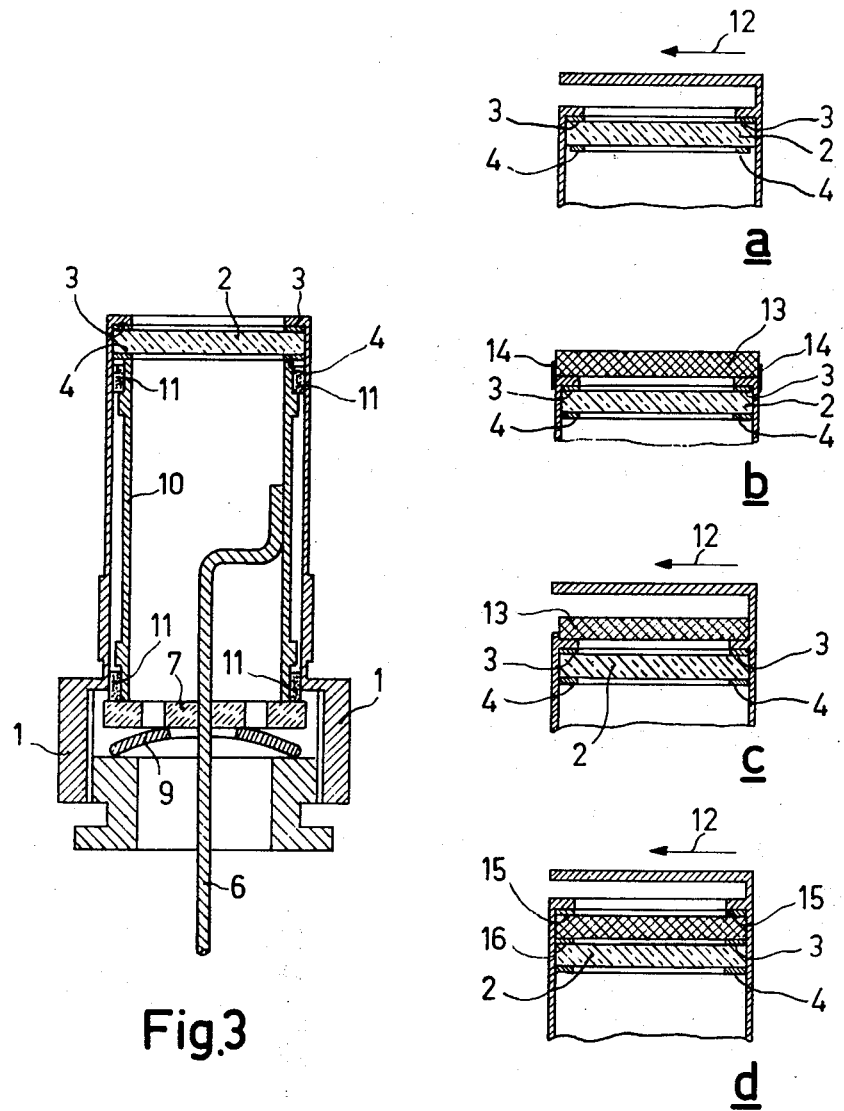

MEASURING CELL FOR DETERMINING OXYGEN CONCENTRATIONS IN A GAS MIXTURE

BACKGROUND OF THE INVENTION

The invention relates to a measuring cell for determining oxygen concentrations in a gas mixture. A cell of this kind is known, for example, from the "Journal Electrochemical Society" 109, 723 – 726 (1962). It has a partition consisting of a solid material undergoing a reversible reaction with oxygen and exhibiting ionic conductivity, which partition is provided on both sides with a thin metallic and/or semi-conducting electrode layer. According to the embodiment to which the relevant invention relates, such a solid material is stabilized zirconium oxide which exhibits conductivity by means of oxygen ions while the electrodes consist of a rare metal such as platinum. The gas mixture whose partial oxygen pressure or absolute oxygen pressure must be measured is present on one side of the partition. A reference gas having a known constant partial oxygen pressure is present on the other side.

In the present invention, air is preferably chosen for this purpose. At a sufficiently high temperature, in practice between 400° and 850°C, a voltage difference E is produced by movement of the ions between the two electrodes, which difference, in accordance with the Nernst equation $$E = (RT/2zF) \ln (p_1/p_2)$$

depends on the ratio of the partial pressures $p_1$ and $p_2$.

In this equation R is the gas constant the Joules/°C, T is the absolute temperature, z is the valency of the oxygen ion, and F is the Faraday constant in Coulombs.

The cell may alternatively be used for measuring carbon monoxide in a gas mixture because this carbon monoxide at low concentrations is in equilibrium with oxygen in accordance with the equation $$CO + \tfrac{1}{2} O_2 \rightleftarrows CO_2.$$

An important use of the measuring cell according to the invention is therefore in an arrangement in which the cell is placed in an exhaust gas pipe of a combustion engine in which a pressure dependent on the CO content is generated. This arrangement which is extensively described in the UK patent application 13319/70 (U.S. Applications Ser. No. 248,928, now U.S. Pat. No. 3,738,341 and Ser. No. 19,438, now abandoned), comprises a control member for controlling the air/fuel ratio λ and a feedback acting on this member, so that the ratio λ is increased when the pressure generated by the cell increases.

Zirconium oxide exhibits the phenomenon of ageing. In addition, the surface of a partition consisting of zirconium oxide is easily contaminated and/or poisoned. As a result, the partition must be replaced after some time due to a gradually increasing inertia of the cell. In the embodiments of the cell hitherto described, this repeated necessity of replacement presented drawbacks. In fact, it made the cost of maintenance of the cell inadmissibly high. In these embodiments the $ZrO_2$ partition consists of a pipe.

According to a known embodiment the pipe is connected on both sides to a glass intermediate piece, while the connection must be located outside the high temperature zone. The glass intermediate pieces are connected to metal flanges possibly through a bellows. This construction is mechanically not very strong and expensive.

Another known construction likewise comprises a pipe-shaped $ZrO_2$ partition which is connected through a metal ceramic joint by means of soldering to metal bushings on both sides. This embodiment has the drawback of a still shorter lifetime of the $ZrO_2$ body in the order of only 10 hours which is due to the intrinsic corrosion of the metal-ceramic joint by contact with oxygen at an elevated temperature.

Another embodiment is the one in which a $ZrO_2$ tube having a melt ceramic is connected to platinum in which there is no corrosion but in which the cost of replacement of the $ZrO_2$ tube is rather high.

SUMMARY OF THE NEW INVENTION

The measuring cell according to the invention which comprises a partition consisting of stabilized zirconium oxide, is characterized in that the partition consists of a flat plate which is provided as a closure between two non-corroding metal rings. On one side of a metal bushing which is open at both ends, the outer metal ring establishes electrical contact with the bush and the inner metal ring is insulated relative to the bushing but is electrically connected to a lead-through conductor which is present in a plate of insulating material having at least one gas stream aperture. The metal rings, the zirconium oxide plate and the plate provided with the lead-through conductor are clamped detachably in the bushing optionally together with one or more spacers.

The zirconium oxide plate may be coated with a porous layer of platinum by means of cathode sputtering, for example, in the form of a network in which the surface of the plate remains accessible for the gas to be analysed. However, a substantially equal sensitivity of the cell is obtained when an uncoated plate is used in which, however, the above-mentioned metal rings on either side of the $ZrO_2$ plate consist of platinum. Metal rings are advantageously used which are coated with a thin layer of finely divided platinum black. Palladium rings, silver rings, and silver-plated rings are alternatively possible.

In some uses of the measuring cell, such as in the above-mentioned arrangement in which the cell is placed in the exhaust gas pipe of a combustion engine, it is desirable to use a filter in combination with the measuring cell. In order to prevent clogging of the filter, the filter is not used in the gas stream, but a so-called diffusion filter, for example, of sintered stainless steel which is placed in a dead angle in the space.

BRIEF DESCRIPTION OF THE DRAWINGS

FIG. 3 shows another embodiment thereof in front elevation view, in section. FIG. 4 shows four modifications of FIG. 1 in fragmentary views.

DESCRIPTION OF THE PREFERRED EMBODIMENT

Figure 1:
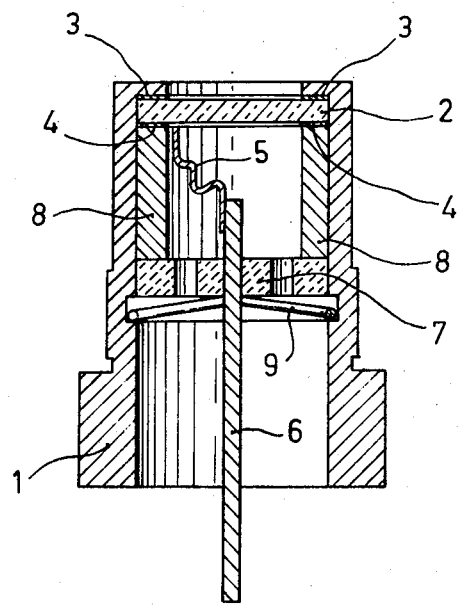
FIGS. 1 and 2 of the accompanying drawing show on a scale of 2:1, an embodiment of the measuring cell according to the invention in a vertical cross-section and in a vertical projection.
Figure 2:
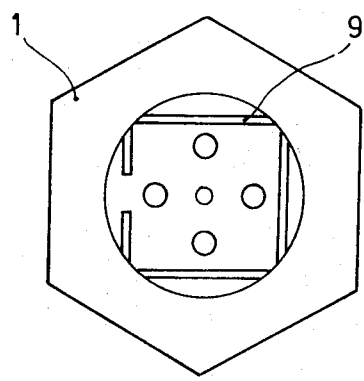

In this drawing (1) represents a metal bushing, (2) is the exchangeable plate consisting of stabilized zirconium oxide, for example, $ZrO_2$ with 7.5 percent by weight of CaO, which is clamped between two platinum rings 3 and 4. The inner ring 4 is connected by means of a flexible conductor 5 to the rigid conductor 6 which is passed through the insulating plate 7 provided with gas stream apertures and consisting of, for example, aluminium oxide. A cylindrical insulating spacer 8 is placed between the ring 4 and the plate 7, which spacer likewise consists of, for example, aluminium oxide. The assembly within the bushing 1 is pressed together by means of a spring 9 and maintained in position.

FIG. 3 shows a modification in which a metal bushing 10 which is insulated through ceramic rings 11 is present instead of a flexible conductor.

FIG. 4 shows four modifications for positioning the filter in which the upper part of the measuring cell is shown. In FIG. 4a 12 denotes the direction of the gas stream. The cell is present in a dead angle. In FIG. 4b a stainless steel filter 13 having nickel strips 14 is secured before the aperture of the measuring cell. Embodiment 4c is a combination of 4a and 4b, while 4d is an embodiment in which a ceramic filter (16) is provided through an asbestos packing 15.

What is claimed is:

1. A measuring cell for determining oxygen concentration in a gas mixture, comprising:

a metal cylindrical housing defining two open ends and a bore, a first plate comprising stabilized zirconium oxide, 1st and 2nd non-corroding metal rings on each side of the plate, said plate and rings situated in said bore with the 1st ring adjacent one of said ends and in electrical contact with said housing, and the 2nd ring axially inward of the 1st ring and electrically insulated from said housing, a second plate of non-conducting material positioned in said bore axially apart and inward from the 1st plate and rings with a measuring space defined between said plates, said second plate having at least one aperture through which said space is accessible, a 1st electrical conductor traversing said 2nd plate with one end extending into said space, a flexible electrical conductor interconnecting said 1st electrical conductor and said inner ring; and means for removably securing said 1st and 2nd plates, spacer, and rings in said bore.

2. Apparatus according to claim 1 wherein said 1st plate is un-coated zirconium oxide, and said rings comprise material selected from the group consisting of platinum, palladium, silver, and silver plate.

3. Apparatus according to claim 1 wherein said 1st plate comprises $ZrO_2$ with a layer of porous platinum.

4. Apparatus according to claim 1 further comprising a diffusion filter situated in said measuring space.

5. A measuring cell for determining oxygen concentrations in a gas mixture comprising an electrically conductive cylindrical housing having a bore with open ends, a subassembly removably secured in said bore, the sub-assembly comprising a non-conductive cylindrical spacer having 1st and 2nd ends, a 1st plate of zirconium oxide closing said 1st end, a 2nd plate of non-conducting material including an aperture therethrough closing said 2nd end of the spacer and defining between said plates a measuring space, an inner ring of noncorroding metal separating the 1st end of the spacer and said 1st plate, an outer ring of similar material on the opposite side of said 1st plate, the subassembly positionable within said bore with the outer ring in electrical contact with said housing bore, the ring electrically insulated from said bore, spring means having a first part engaging a part of said bore and a second part engaging and urging said subassembly parts together and toward said first end of said bore, a rigid electrical conductor extending axially in said bore and traversing said 2nd plate and extending into said measuring space, and a flexible electrical conductor interconnecting said inner ring and said rigid conductor.

6. Apparatus according to claim 5 wherein said 1st plate is un-coated zirconium oxide and said rings comprise material selected from the group consisting of platinum, palladium, silver, and silver plate.

* * * * *